W. C. Moat,
Piston Packing.
Nº 6,974.  Fig 3.                                Patented Dec. 25, 1849.
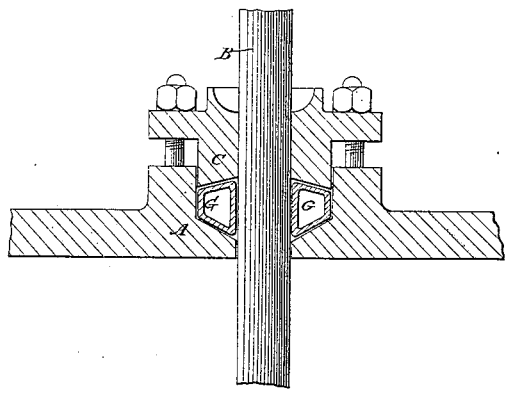
Fig. 4.
Fig. 2.
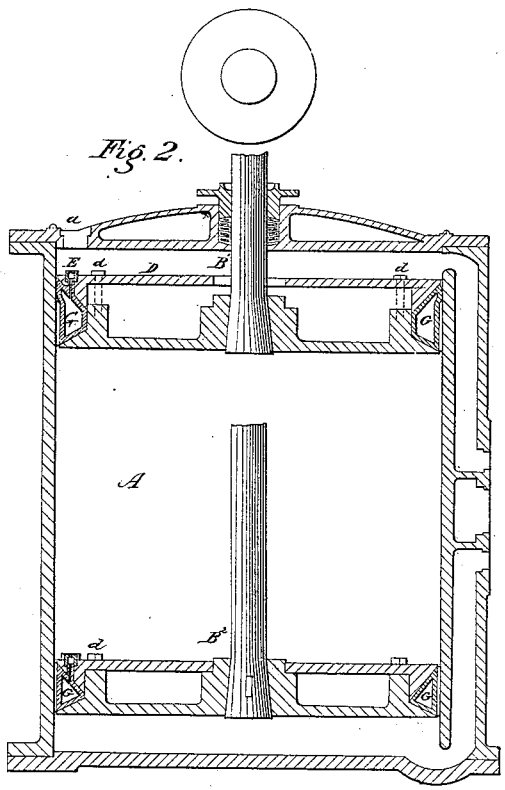
Fig. 5.
Fig. 1.
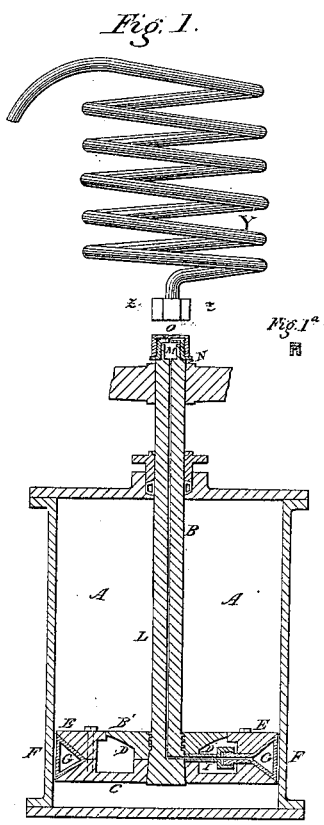
Witnesses:                                         Inventor.
                                              William Preston Moat

UNITED STATES PATENT OFFICE.

WILLIAM C. MOAT, OF COUNTY MIDDLESEX, ENGLAND.

TUBULAR PACKING FOR PISTONS AND STUFFING-BOXES.

Specification of Letters Patent No. 6,974, dated December 25, 1849.

*To all whom it may concern:*

Be it known that I, WILLIAM CROFTON MOAT, of Upper Berkeley Street, Middlesex, surgeon, a subject of the Queen of Great Britain, have invented or discovered new and useful Improvements in Engines to be Worked by Steam, Air, or Gas; and I, the said WILLIAM CROFTON MOAT, hereby declare that the nature of the said invention and in what manner the same is to be performed are fully described and ascertained in and by the present specification thereof, reference being had to the drawings hereunto annexed—that is to say, My said invention has for its object to construct the pistons and stuffing boxes of engines worked by steam, air or gas in such manner or with such appliances that they shall fit more exactly and be less subject to change of form and consequent leakage than heretofore and the manner in which the said object is carried into effect is exemplified in the drawings hereunto annexed and in the following description thereof.

Figure 1 is a sectional elevation of so much of a steam engine as is necessary to show how I propose to effect the better fitting or packing of pistons.

A, A, is the cylinder with its covers and stuffing box—B the piston rod F a solid metal ring which is turned to fit the inside of the cylinder and forms the exterior of the piston B'.

C is the lower plate of the piston D the central portion of the upper plate or as it is commonly called the junk ring and E the outer or peripheral portion of the latter.

G is a hollow ring which is made of some soft or yielding material as lead or vulcanized caoutchouc and fits into a recess made for it in the body of the piston and abuts outwardly against the metal ring F. The ring is in its original state of a circular form but when pressed into the recess it takes the triangular shape or nearly so represented in the drawing.

L is a passage which is bored down through the center of the piston rod and terminates in another passage L' which diverges from it at a right angle and is connected by a union joint I to a third pipe J which leads into the heart of the hollow ring G.

M is a valve box which covers in the passage L at top P a piece of cork with a crutch or stool Q (see detached view of these parts in Fig. 1ª) which fits into M and O a cap to M, Y is a coil of tubing (of indefinite length) which is attached when required by union joints z, z, to the top of the valve box M at one end and to an air forcing pump placed by the side of the engine or in any other convenient position. The use of the hollow yielding ring G is to keep the metal ring F pressed out against the sides of the cylinder and this is effected by charging it at intervals with air from the pump and to any amount of pressure which may be found requisite. When the ring is to be charged the cap O, of the valve box M is removed and the coil of pipe Y attached by its inner joints z, z, to the valve box M at one end and to the pump at the other. The requisite injection of air is effected by working the air pump and the degree of pressure produced on the interior of the hollow ring is indicated by a pressure gage. When the ring has been pressed tightly against the cylinder sides the pressure should be reduced about one half by unscrewing the top of the valve box until the gage indicates that the desired degree of reduction has been obtained (which the coils in the pipe allow of being done without disturbance to the union joints). The top of the valve box should then be rescrewed down tight against its seat the pipe Y removed and the cap O put on to prevent any air escaping past the valve.

The arrangements which have been thus described will it is obvious answer equally whether the ring in immediate contact with the cylinder sides is solid as represented in the drawings or split or composed of a number of segments.

It will be obvious also that instead of forcing in the air through a passage bored in the piston rod it may be introduced through a pipe passed down through the cylinder (along side the piston rod), into the body of the piston and which pipe may be either rigid or flexible. Or the air may be injected directly into the piston by introducing a hand condensing syringe through a door in the cylinder cover and inserting the nozzle of it into an opening in the body of the piston. An arrangement suitable to both these plans is represented in Fig. 2. A is the cylinder and *a* a door in the cylinder cover for the introduction of the pipe or syringe as the case may be. B the piston. D the upper plate or junk ring. G the hollow yielding ring and E the opening in the piston which in the case of the hand syringe being used should be covered by a valve of the same kind as that before described as used for covering the passage through the body of the piston rod. Again instead of a constant command being maintained by the means aforesaid over the pressure so that it may be supplied only when wanted and to the exact amount wanted the hollow ring G may be changed in the first instance with compressed air to such an extent in excess of the average presure required as to obviate any necessity for renewal in which case the air pump and air passages and their respective appendages would be dispensed with. Such an arrangement would leave the engineer without any ready means of assuring himself of the soundness of the piston.

The objection to the preceding arrangement does not however apply to the stuffing boxes of cylinder covers especially in the case of engines worked at a low pressure and with respect to these therefore I do recommend the employment in place of the ordinary modes of packing of air tight hollow rings of some yielding metal or substance charged at once with compressed air to such an extent that this air shall have a constant tendency to press them outward on all sides.

A mode of charging a piston different from that before described is shown in Fig. 2. B' is a section of a piston in a partially finished state and B² a section of it as ready for working. The hollow yielding ring G is dropped loosely into a place made for it between the under and upper plates of the piston and close to their respective peripheries and the plates are then drawn together by means of the screw bolts $d, d$ until the ring G is compressed into a much smaller space than it originally occupied and the air within it is also proportionally compressed.

Fig. 3, is a sectional elevation of a piston rod and stuffing box packed in the same manner just described and in its complete state. A is the cylinder cover B the piston rod C the stuffing box and G the yielding hollow ring.

Fig. 4 is a plain of the ring G. Instead of employing yielding hollow rings applied in a horizontal position to pack pistons and stuffing boxes as before described I sometimes effect the same object by means of short lengths of tubing of lead or other yielding material applied spirally in the manner exemplified at $A^3$ in Fig. 2, which is a section of a stuffing box on this plan. The pipe is first tapered off and closed at the two ends as shown in Fig. 5 and then coiled around the piston rod with the bottom end resting on the under plate of the stuffing box. The upper plate is then screwed down upon the pipe till it is not only pressed out at both sides (that is against the piston at one side and the cylinder cover at the other) but is altogether compressed into a much narrower space than it originally occupied accompanied with a corresponding compression of the air in the inside of it.

And having now described the nature of my said invention and in what manner the same is to be preformed I declare that what I claim as of my invention is—

The employment of yielding hollow rings and yielding tubing (of whatever material the same may be composed) filled with air or gas more or less compressed for the better packing of the pistons and stuffing boxes of engines worked by steam, air or gas as before exemplified and described.

WILLIAM CROFTON MOAT.

Witnesses:
R. A. BROOMAN,
S. B. MILNE.